Figure 1:
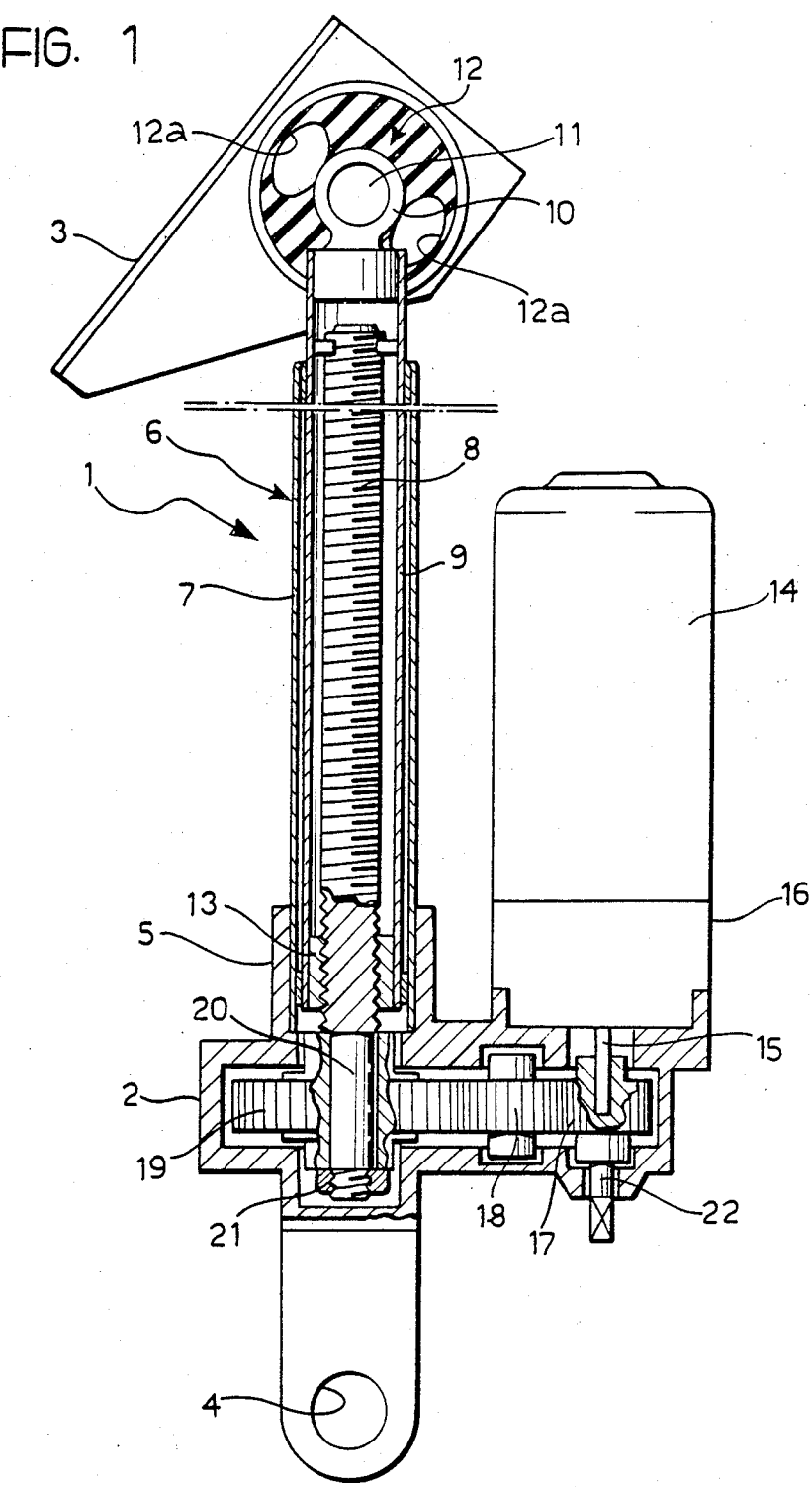

United States Patent [19]

Gheddo

[11] Patent Number: 4,790,201
[45] Date of Patent: Dec. 13, 1988

[54] ELECTROMECHANICAL LINEAR ACTUATOR FOR TIPPING THE DRIVER'S CAB OF A COMMERCIAL VEHICLE

[75] Inventor: Carlo Gheddo, Turin, Italy
[73] Assignee: Iveco Fiat S.p.A., Turin, Italy
[21] Appl. No.: 41,280
[22] Filed: Apr. 22, 1987
[30] Foreign Application Priority Data
Jan. 21, 1987 [IT] Italy .............................. 52870/87[U]
[51] Int. Cl.⁴ .............................................. F16H 19/02
[52] U.S. Cl. ................................ 74/89.15; 74/424.8 R
[58] Field of Search ...................... 74/89.15, 424.8 R; 248/635

[56] References Cited

U.S. PATENT DOCUMENTS

| | | | |
|---|---|---|---|
| 2,476,376 | 7/1949 | Laraque | 74/424.8 R |
| 2,496,448 | 2/1950 | Dunlavey | 74/424.8 R |
| 2,541,529 | 2/1951 | McVicker | 74/424.8 R |
| 2,868,030 | 1/1959 | Forwald | 74/424.8 R |
| 3,038,352 | 6/1962 | Murphy | 74/424.8 R |
| 3,727,472 | 4/1973 | Maekawa | 74/89.15 |
| 3,968,705 | 7/1976 | Amano et al. | 74/424.8 R |
| 4,679,451 | 7/1987 | Nakamura | 74/424.8 R |

FOREIGN PATENT DOCUMENTS

| | | | |
|---|---|---|---|
| 955900 | 1/1950 | France | 248/635 |
| 647560 | 12/1950 | United Kingdom | 74/424.8 R |
| 779420 | 7/1957 | United Kingdom | 74/424.8 R |

Primary Examiner—Leslie A. Braun
Assistant Examiner—Scott Anchell
Attorney, Agent, or Firm—Sughrue, Mion, Zinn, Macpeak & Seas

[57] ABSTRACT

A linear actuator for tipping the driver's cab of a commercial vehicle comprises a telescopic strut of the screw-and-nut type, in which the screw is rotated by an electric motor and the nut is associated with a hollow shaft movable axially along the screw and connected at its top to the vehicle cab.

3 Claims, 2 Drawing Sheets

ELECTROMECHANICAL LINEAR ACTUATOR FOR TIPPING THE DRIVER'S CAB OF A COMMERCIAL VEHICLE

The present invention relates to devices for effecting the raising or tipping of driver's cabs of commercial vehicles.

Conventionally, the present devices for tipping the cabs are constituted by hydraulic jacks connected to a manually or electrically operated pump.

In addition to the main hydraulic actuator, these known devices normally include further secondary actuators for safety purposes, as well as complicated valve devices with their connecting lines.

As well as being expensive to construct for these reasons, the known hydraulic devices require long and complicated assembly and fitting operations. In use, loss of hydraulic fluid is not infrequent and may make it impossible to attain the necessary pressure to tip the cab. Furthermore, these hydraulic devices require the use of supplementary safety features to prevent the cab from tipping in the event of accidental release of the cab from the vehicle in motion.

The object of the present invention is to avoid the disadvantages specified above and to provide a linear actuator for tipping the driver's cab of a commercial vehicle, which is strong and simple to manufacture, quick and easy to assemble, as well as very safe and reliable in operation.

The actuator according to the invention is characterised in that it comprises a telescopic strut of the screw-and-nut type, in which the screw is rotated by means of an electric motor and the nut is associated with the hollow shaft movable axially along the screw and connected at its top to the vehicle cab.

The actuator according to the invention enables the disadvantages of conventional hydraulic actuators to be overcome by a simple, compact and practical arrangement. It allows the raising of the cab in use to be stopped at any point in its travel before complete tipping, in that the screw-and-nut mechanism means that the actuator is not spontaneously reversible. Moreover, the actuator according to the invention enables the elimination of the safety devices necessarily associated with conventional hydraulic actuators to avoid tipping of the cab if it is released accidentally or while the vehicle is in motion, since in this event the strut of the actuator according to the invention acts as a tie-rod to stop the raising of the cab.

According to the invention, the electric motor is disposed alongside the base of the strut with its shaft arranged parallel to the axis of the latter, and the rotation of the shaft of the motor is transmitted to the screw through a set of reduction gears, one of which is provided with an operating appendage which can be operated manually from the exterior in emergencies.

The hollow shaft is preferably slidable within an outer tubular guide member fixed at its lower end to a support body carrying the electric motor and the set of reduction gears, as well as means for retaining the screw axially relative to the tubular guide member.

Figure 2:
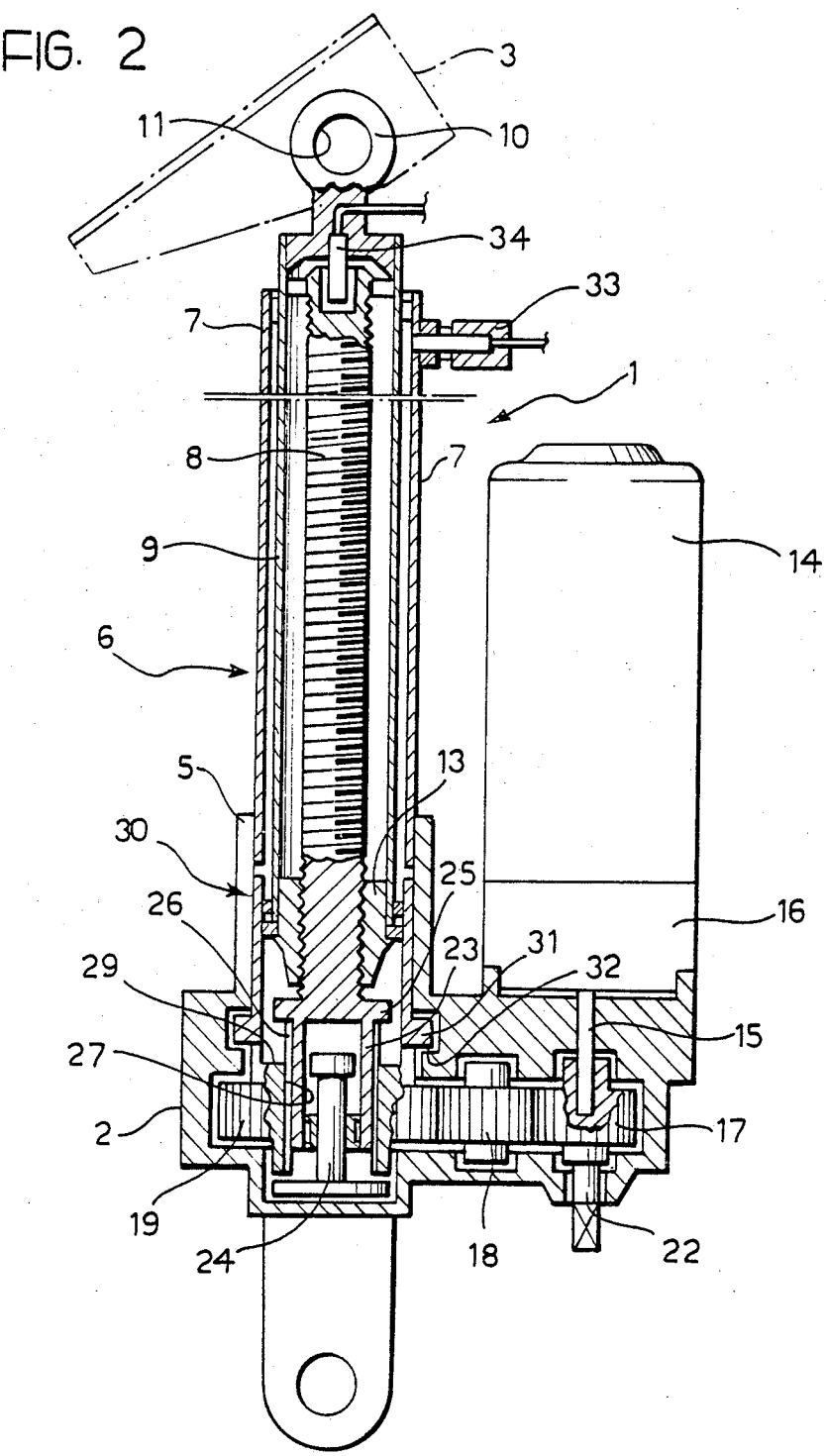

Further characteristics and advantages of the invention will become apparent during the detailed description which follows with reference to the appended drawings, provided purely by way of non-limiting example, in which:

FIG. 1 is a schematic axial sectional view of a linear actuator according to the invention for tipping the driver's cab of a commercial vehicle, and FIG. 2 is a view similar to FIG. 1 of a modified form of the actuator.

With reference initially to FIG. 1, an electromechanical linear actuator according to the invention is generally indicated 1 and is interposed between an attachment 3 fixed, in a manner not illustrated, to the floor of the vehicle cab and a support body 2 provided with a part 4 for attachment to the chassis of the vehicle.

The body 2 has a hollow appendage 5 on its upper side, in which is inserted the lower end of a telescopic strut 6 including an outer tubular guide member 7, a threaded rod 8 extending coaxially and rotatably within the guide member 7, and a hollow shaft 9 inserted so as to be slidable axially between the outer tubular guide member 7 and the threaded rod 8.

The upper end of the hollow shaft 9 projects from the guide member 7 and carries an eyelet attachment member 10 engaged by an articulation pin 11 carried by the attachment 3 by means of a block 12 of elastomeric material. The block 12 has two diametrically opposed slots 12a the presence of which means that it has less rigidity along diametral lines passing through these slots 12a than along diametral lines passing through solid zones of the block 12. The orientation of the block 12 is such that, during operation, the lines of action of the actuator 1 pass through these solid zones, that is, through the more rigid zones of the block 12.

An internally-threaded sleeve 13 is fixed rigidly to the lower end of the hollow shaft 9 and acts as a nut on the threaded rod 8.

A reversible electric motor, indicated 14, is fixed to the body 2 alongside the lower portion of the strut, with its shaft 15 extending parallel to the latter.

The shaft 15 of the motor 14, which, in known manner, has an epicyclic reduction unit, schematically indicated 16, acts on a sprocket 17 rotatably supported in the body 2 and acting, through an intermediate drive sprocket 18, on a gear 19 which is also supported for rotation within the body 2 and is coupled for rotation with an end tang 20 of the threaded rod 8. The tang 20 is locked axially relative to the gear 19, or the tubular guide member 7, by means of a retaining nut 21.

The sprocket 17 has an axial tang 22 which projects from the lower side of the body 2 and is hence accessible from the exterior.

In operation, the motor 14 can be activated by means of swtiches (not illustrated) which may equally well be of the push button, rotary lever or key type, but in each case is of a type which returns automatically to a rest position. Their installation on the vehicle will be in a safe position for the operator but such as to allow the same person to release the cab mechanically in known manner.

Starting from the retracted position of the strut 6, illustrated in FIG. 1, which corresponds to the completely lowered condition of the cab, rotation of the motor 14 causes, through the gears 17, 18 and 19, the rotation of the threaded rod 8 as a result of the screwing of the nut 13 thereon, and the consequent upward movement of the hollow shaft 19. The extension of the telescopic strut 6 effected by means of the motor 14 may be stopped at any configuration, even before the passing of the dead-point which is followed by the complete tipping of the cab. In the case of complete tipping, the activation of the motor 14 is interrupted by automatic travel limit switches, not illustrated, for example, similar to those described below with reference to FIG. 2.

If the motor 14 is rotated in the opposite sense from this position, the telescopic strut 6 is returned to the retracted configuration of FIG. 1, which corresponds to the lowering of the cab. Again in this case, a travel limit switch, not illustrated, deactivates the motor 14 automatically.

During the phases of tipping and return of the cab to the lowered position, the resilient block 12 brakes the movement of the cab following the passing of the deadpoint. The particular configuration of the block 12 described above ensures that, during travel of the vehicle, the necessary oscillations with regard to the movement determined by its suspension occur along lines of action passing through the zones of the slots 12a, while the working zones of the block 12 during phases of operation of the actuator 1 are the solid ones which ensure the maximum rigidity along the lines of action of the telescopic strut 6.

In a conventional manner, the electromechanical actuator 1 is also associated with enabling switches on the linkage for controlling the gearbox and on the handbrake lever, in order to ensure the engagement of the second and the positioning of the first in neutral. These enabling switches are not illustrated in that their use is conventional with traditional hydraulic tipping devices.

In the case of failure of the electric motor 14 or insufficiency of the batteries in the vehicle, the tang 22 associated with the sprocket 17 enables the telescopic strut 6 to be extended or retracted in an emergency by means of a manual tool or a pneumatic screwing device acting on this tang 22.

FIG. 2 shows a constructional variant of the actuator 1 of the invention, in which the threaded rod 8 is allowed a limited axial movement in the final phase of contraction and in the initial phase of extension of the telescopic strut 6. In this Figure, in which parts identical or similar to as those described previously are indicated by the same reference numerals, the lower end of the threaded rod 8 is formed as a hollow member 23 guided for axial sliding movement along a travel limiting pin 24 fixed to the body 2. The hollow member 23 has an upper annular stop flange 25 and its outer wall has a splined profile 26 which couples with a corresponding internal splined profile 27 of the gear 19 for axial sliding movement. This gear 19 defines a seat 29 in its upper face for receiving the stop flange 25 of the threaded rod 8 in a manner which will be explained below.

A sleeve 30 is mounted within the hollow appendage 5 of the body 2 and is rendered resiliently expansible and contractible in a radial sense by means of axial slots, not illustrated. The lower edge of the sleeve 30 has an annular enlargement 31 which, as a result of the radial contractions and expansions, is movable within an annular seat 32 formed in the body 2 immediately above the seat 29 for receiving the gear 19.

The operation of the actuator of FIG. 2 is entirely similar to that described above with reference to FIG. 1, except for the fact that the threaded rod 8 can effect limited axial movements relative to the outer guide member 7 during the initial phase of extension and the final phase of contraction of the telescopic strut 6, as already mentioned above and as described below.

The configuration illustrated in FIG. 2 corresponds to the retracted position of the telescopic strut 6, with the cab of the vehicle lowered into a travelling position.

If the motor 14 is activated, the threaded rod 8, which is initially free from reaction, unscrews until the annular stop flange 25 comes to bear on the seat 29 for receiving the gear 19. At this point, the hollow shaft 9 starts its upward movement relative to the tubular guide member 7, raising the cab of the vehicle. Immediately its lower end, constituted in this case by the nut 13, disengages from the sleeve 30, this contracts radially so as to make the annular enlargement 31 re-enter above the stop flange 25 inserted, as stated, in the seat 29 for receiving the gear 19. Thus, the threaded rod 8 is locked axially for the rest of the raising movement of the hollow shaft 9.

This enables the tipping of the vehicle cab to be effected in a controlled manner even beyond its deadpoint, avoiding the threaded rod 8 being entrained axially along the splined coupling 26, 27.

The extension of the telescopic strut 6 continues until the lower end of the hollow shaft 9 is located in correspondence with an automatic travel limit switch 33 attached to the top of the guide member 7 and operatively connected to the motor 14.

When the motor 14 is driven in the opposite sense to return the cab to its lowered position, the hollow shaft 9 slides towards the body 2 until it is again located towards the bottom of the interior of the sleeve 30. At this point the sleeve 30 is again resiliently expanded in the radial sense so as to free the stop flange 25 of the threaded rod 8. The retraction of the hollow shaft 9 then continues until the cab of the vehicle is completely lowered, that is, until the weight of the cab itself is balanced by its suspension. At this point, the translational movement of the hollow shaft 9 being stopped and the threaded rod 8 being free to move axially, this rod 8 is screwed relative to the nut 13. This screwing causes the upper end of the threaded rod 8 to operate a second automatic travel unit switch 34 which is supported coaxially by the upper end of the hollow shaft 9 and by means of which the electric motor 14 is deactivated.

In the final condition shown, as stated, in FIG. 2, the actuator 1 is well able to absorb any shaking movements of the driver's cab, particularly because of the cooperation of the pin 24 with the hollow end member 23 of the threaded rod 8.

Naturally, the scope of the present invention extends to models which achieve equal utility by using the same innovative concept.

I claim:

1. A linear actuator for tipping a driver's cab pivoted on a frame of a commercial vehicle, said actuator comprising:
    a support body adapted to be pivotally mounted on said frame,
    a drive motor mounted on said body,
    a set of reduction gears mounted on said body in operative engagement with said drive motor,
    a driven screw connected to one of said reduction gears for rotation thereby and axial sliding movement relative thereto,
    a hollow shaft adapted to be pivotally connected at one end to said cab, said shaft telescopically surrounding said screw and having a nut at an opposite end thereof in threaded engagement with said screw for extending and retracting said hollow shaft upon rotation of said screw, abutment means disposed on said screw adjacent said reduction gear to limit movement of said screw toward said reduction gear, a radially expansible and contractible sleeve mounted on said body and surrounding the end of said screw adjacent said reduction gearing, said nut being engagable with said sleeve to cause expansion of said sleeve when said nut and shaft are retracted and complementary abutment means on said sleeve adapted to engage said abutment means on said screw when said sleeve is contracted upon telescopic extension of said shaft and movement of said nut out of engagement with said sleeve to prevent axial movement of said screw relative to said reduction gear.

2. A linear actuator according to claim 1, wherein said screw has a hollow base member with external axially extending splines disposed in engagement with said reduction gear and further comprising pin means mounted on said body and extending into said hollow base member to guide said hollow said base member and said screw for axial movement relative to said reduction gear.

3. A linear actuator according to claim 1, wherein said motor is an electric motor and further comprising travel limit switches operatively associated with said shaft and gear and operatively connected to said electric motor to control the operation of the motor in response to movement of said shaft and said screw.

* * * * *